April 30, 1935.  A. GRAHAM-ENOCK  1,999,323
PASTEURIZING APPARATUS FOR LIQUIDS
Filed March 16, 1933    7 Sheets-Sheet 1

A. Graham-Enock
INVENTOR

By: Marks & Clerk
Attys.

April 30, 1935.  A. GRAHAM-ENOCK  1,999,323
PASTEURIZING APPARATUS FOR LIQUIDS
Filed March 16, 1933   7 Sheets-Sheet 4

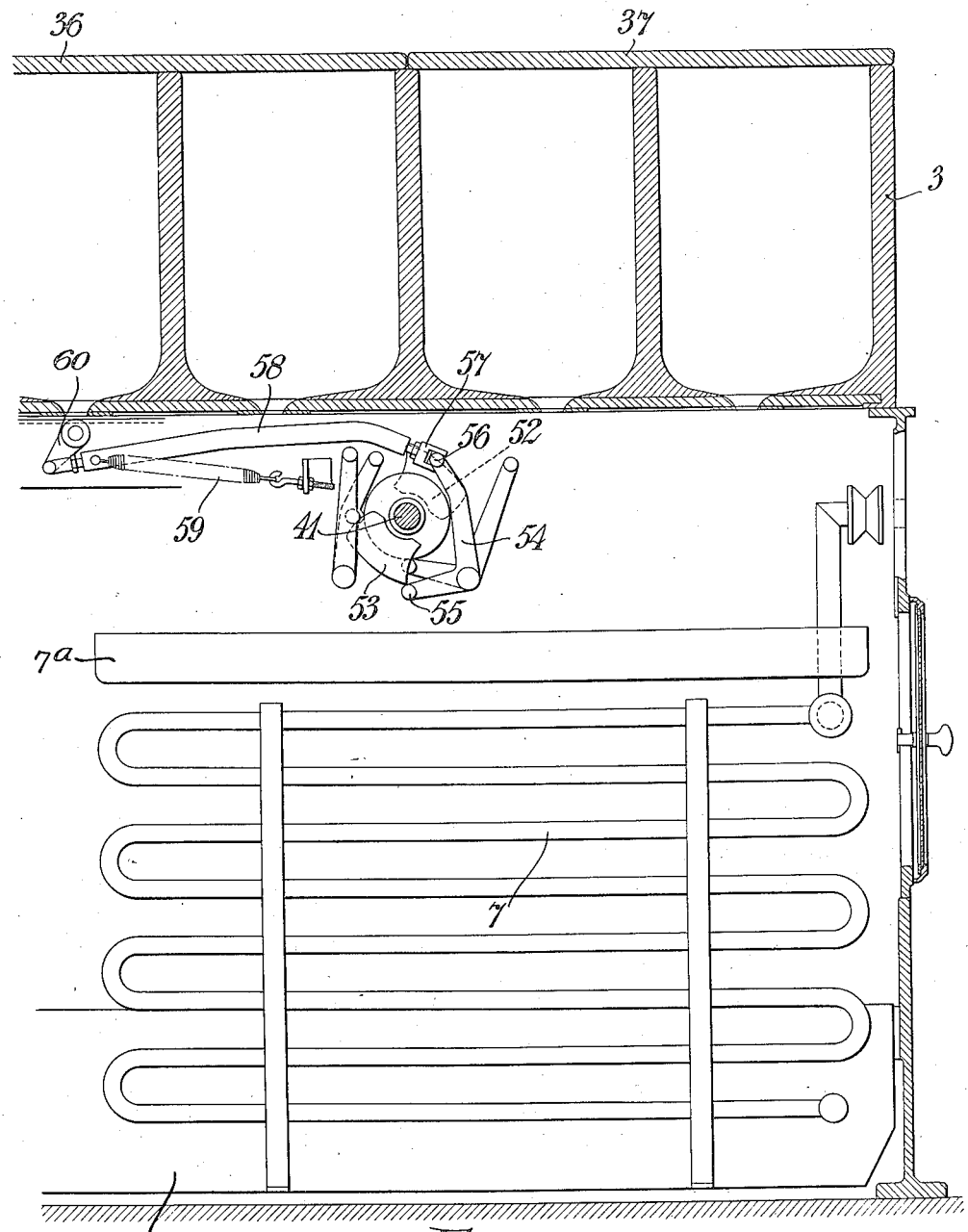

Patented Apr. 30, 1935

1,999,323

UNITED STATES PATENT OFFICE 1,999,323

PASTEURIZING APPARATUS FOR LIQUIDS

Arthur Graham-Enock, Stamford Hill, London, England, assignor of one-half to Graham-Enock Manufacturing Company Limited, London, England Application March 16, 1933, Serial No. 661,163
In Great Britain April 6, 1932

11 Claims. (Cl. 257—11)

This invention relates to the pasteurizing of liquids, such as milk, and has particular reference to apparatus intended for pasteurizing milk in bulk, as distinguished from pasteurization in bottles or other relatively small containers.

The main object of the invention is to effect the pasteurization rapidly and in the most efficient manner while avoiding conditions likely to have a deleterious effect on the pasteurized product, and particularly to avoid the necessity of pumping the milk or other liquid while in a heated state during or after pasteurizing.

Another object of the invention is to provide a convenient and simple form of pasteurizing apparatus in which the various units of the plant are disposed in the most advantageous manner from the point of view of accessibility and convenience of operation, and further to provide an efficient form of apparatus which occupies a minimum of floor space.

The invention consists in a self-contained or unitary apparatus or plant for pasteurizing milk or other liquid, wherein the liquid is passed through heating coils or elements on its way to a holding tank from which it flows by gravity over cooling coils or elements certain of which are employed for regenerative preheating of the liquid before it is raised to the pasteurizing temperature, the apparatus being adapted to effect the various stages of the treatment in a continuous process.

In the preferred form of the invention, the apparatus includes a steam, water or other heating arrangement through which the liquid passes and may also include a refrigerating unit, through which the water supplied to the cooling coils or elements is circulated.

The heating and cooling coils or elements may be mounted on a common frame structure which is also adapted to support an insulated reservoir or tank in which the liquid under treatment is held at the pasteurizing temperature for a predetermined period, on the completion of which it is discharged from the tank and flows in the form of a stream or curtain over the cooling element which may comprise a vertical stack of pipes or equivalent form of cooling means. The cooler element may be constructed in separate sections, which are hinged or otherwise movably mounted to facilitate cleaning and inspection.

According to a further feature of the invention, the tank or reservoir in which the pasteurizing or holding stage of the process is effected is movably or pivotally mounted on the frame of the apparatus in such a manner that it may be swung downwardly and outwardly when required to afford access to the interior of the tank for cleaning purposes. The tipping of the tank is preferably assisted and controlled by providing hydraulic or screw jacks or other mechanical aid devices, which may be mounted at either end of the tank.

Referring to the accompanying drawings:

Figure 5 is a fragmentary longitudinal section of the apparatus or plant showing part of the refrigerating unit;

Figure 6 is a plan view of the distributor for supplying the compartments of the holding tank, the head of the distributor being removed;

Figure 7 is a plan view of the distributor head;

Figure 11 is a part of the mechanism shown in Figure 10.

Figure 1:
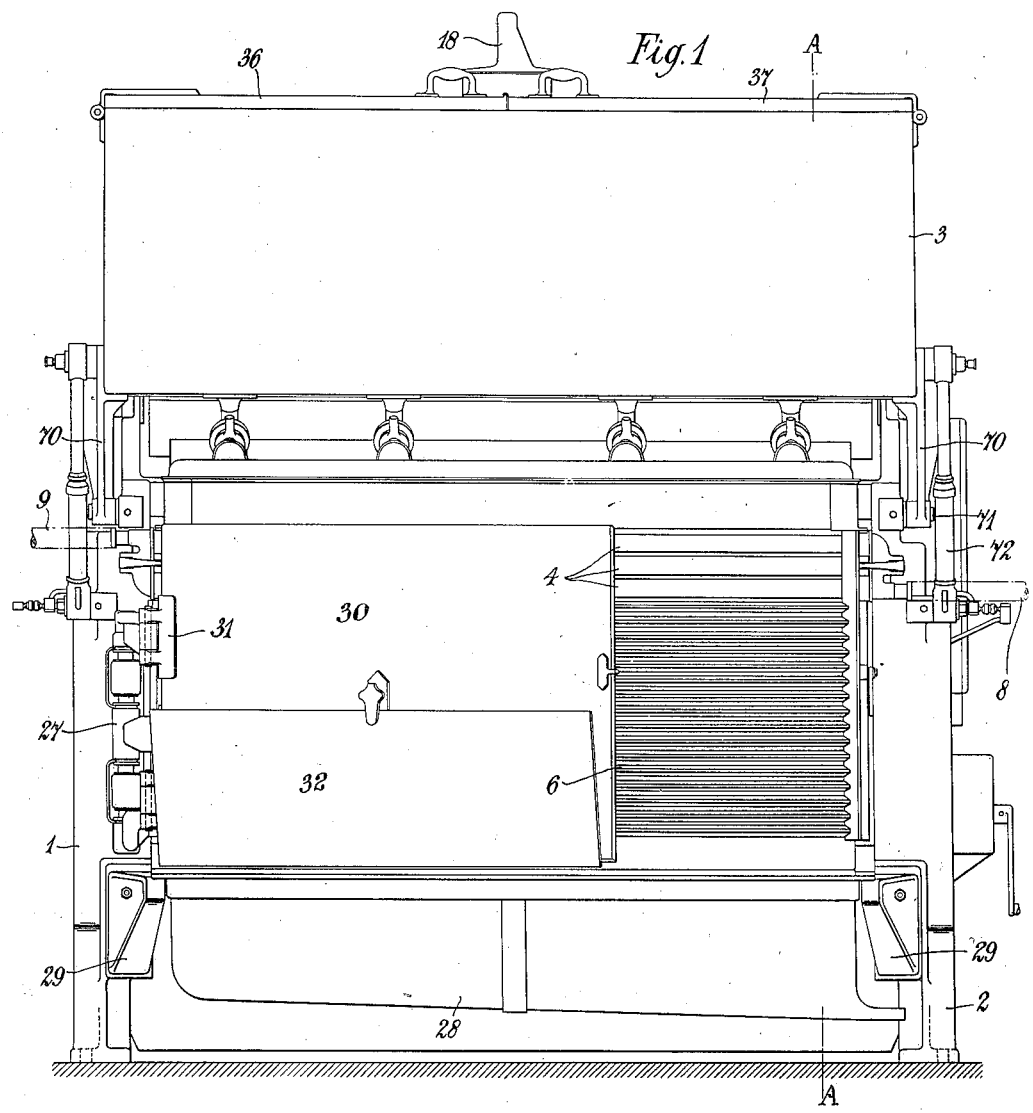
Figure 1 is a front view of an apparatus or plant for pasteurizing milk in bulk according to the invention, showing one of the front covers opened to afford access to the cooler elements.
Figure 2:
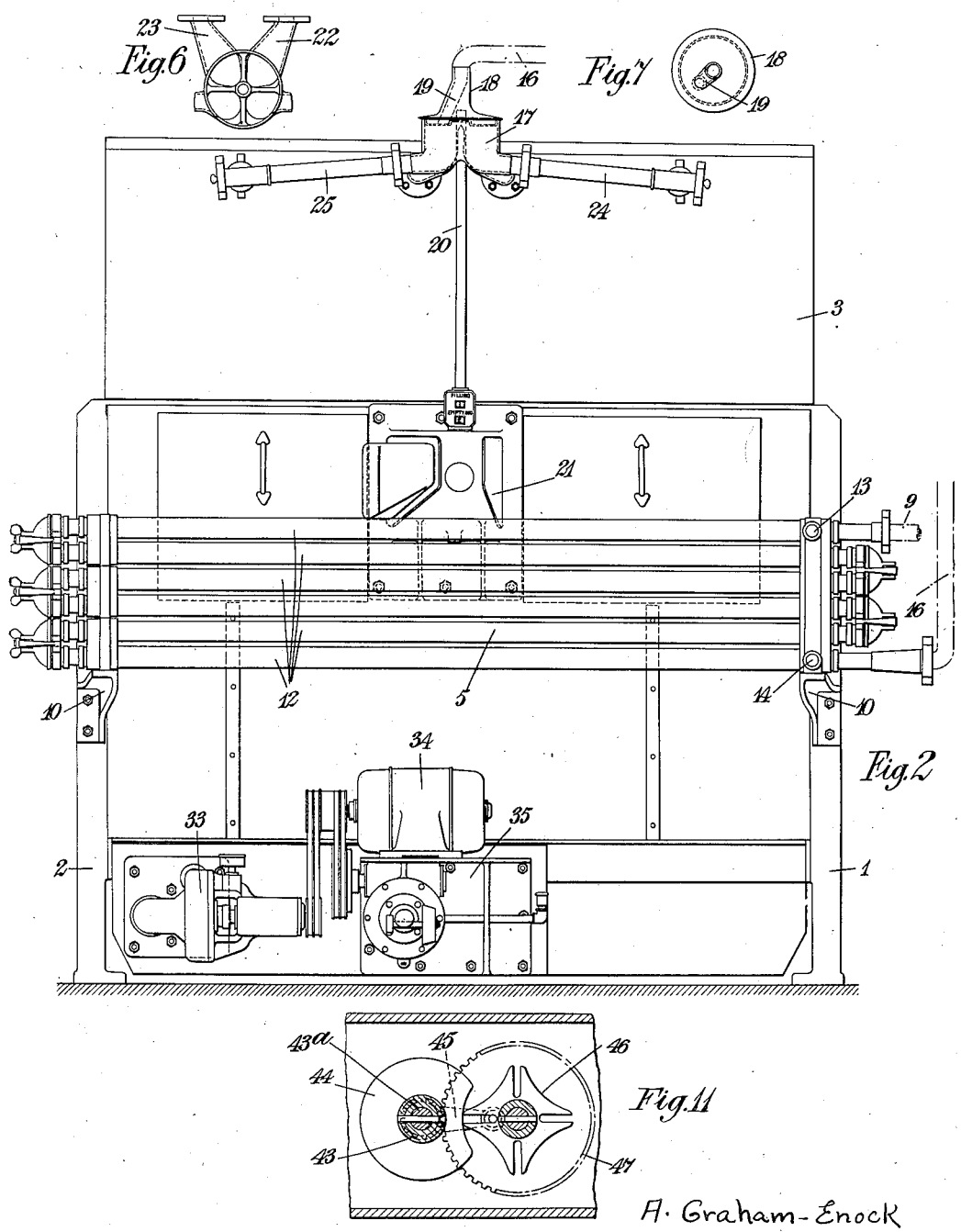
Figure 2 is a view of the same apparatus or plant as seen from the rear.

In carrying the invention into effect according to one convenient mode as applied, by way of example, to the pasteurization of milk in bulk as a continuous process, the apparatus or plant comprises end frame elements 1 and 2 which support a milk holding tank 3, a preheater 4, heater 5, and cooler 6. The main framework of the apparatus also includes a refrigerating device 7 for supplying cooling medium to the cooler. Raw milk enters the apparatus under suitable pressure through a pipe 8 and traverses a series of preheating pipes 4 which form a shallow vertical bank extending along the front of the frame as indicated in Figure 1 of the drawings, the pipes being connected at their ends to suitable headers which direct the milk through each pipe in turn. These pipes also serve to effect a preliminary cooling of the pasteurized milk as will be explained hereinafter. After leaving the preheater the milk passes through a connecting pipe 9 to the heater indicated generally by 5, which consists of a series of double or jacketed pipes mounted on brackets 10 at the rear of the apparatus and extending from end to end of the frame. The milk passes through the internal pipes 11 which are connected in series to form a zig-zag path and receives heat from a suitable heating medium, such as hot water or steam, which is supplied to the jackets 12. Connections for the heating medium are indicated at 13 and 14 in Figures 2 and 4. The heater is designed to raise the temperature of the milk to approximately 145° F. and this temperature may be maintained automatically by means of some well known form of thermostatic device (not shown) controlling the supply of heating medium.

A pipe 16 conducts the heated milk to a distributor consisting of a body portion 17 divided in this instance into four compartments (although more may be employed) as shown in Figure 6 and a rotary head 18 formed with an internal passage 19 arranged to discharge into one of the said compartments according to the position of the head which is controlled by a shaft 20 connected to the timing mechanism indicated generally at 21. The tank 3 is also divided in this instance into four compartments (although more may be employed) as shown in Figure 5 which are each connected to one of the distributor compartments by conduits 22, 23, 24 and 25. These compartments may be emptied as described hereinafter into a trough 26 located beneath the tank and extending the whole length thereof. The trough is provided with a perforated bottom which is arranged immediately above the bank of preheating pipes 4 below which and in the same vertical plane is the cooler 6. This cooler, which may comprise a bank of pipes or other suitable construction, is preferably formed in one, two or more sections which are hinged as at 27, thus enabling a complete cooler section to be swung outwardly for inspection or cleaning purposes. Below the coolers is arranged a collecting trough or tank 28 supported on brackets 29 secured to the frame, and from this trough suitable connections may be provided for delivering the milk either to bottle filling machines or to churns or other receptacles as may be desired. It is to be understood that the preheating and cooling pipes are contained in a closed chamber so that the entry of foreign matter is effectually prevented. The front of the cooler chamber is formed by doors 30 hinged at 31 so that access may be obtained to the coolers. Similarly, the trough 28 is provided with hinged covers 32.

It will be understood that other means than the distributor described above may be employed for delivering the liquid to the various compartments, for example, a header pipe may be arranged above the tank and the admission to the various compartments controlled by separate valves.

The upper portion of the cooler section 6 is supplied with ordinary mains water whilst the lower portion thereof is supplied with chilled water obtained from a refrigerator. The fixed part of the hinge 27 on which the cooler section is mounted comprises outlet and inlet branches A and B (indicated by dotted lines in Figure 4 of the drawings), for the mains water, and outlet and inlet branches C and D for the chilled water. The movable part E of the hinge is provided with a dividing wall F and the inlet and outlet branches previously referred to communicate with the upper and lower portions of the cooler which is provided with headers suitably partitioned as is well understood in the art.

Figure 4:
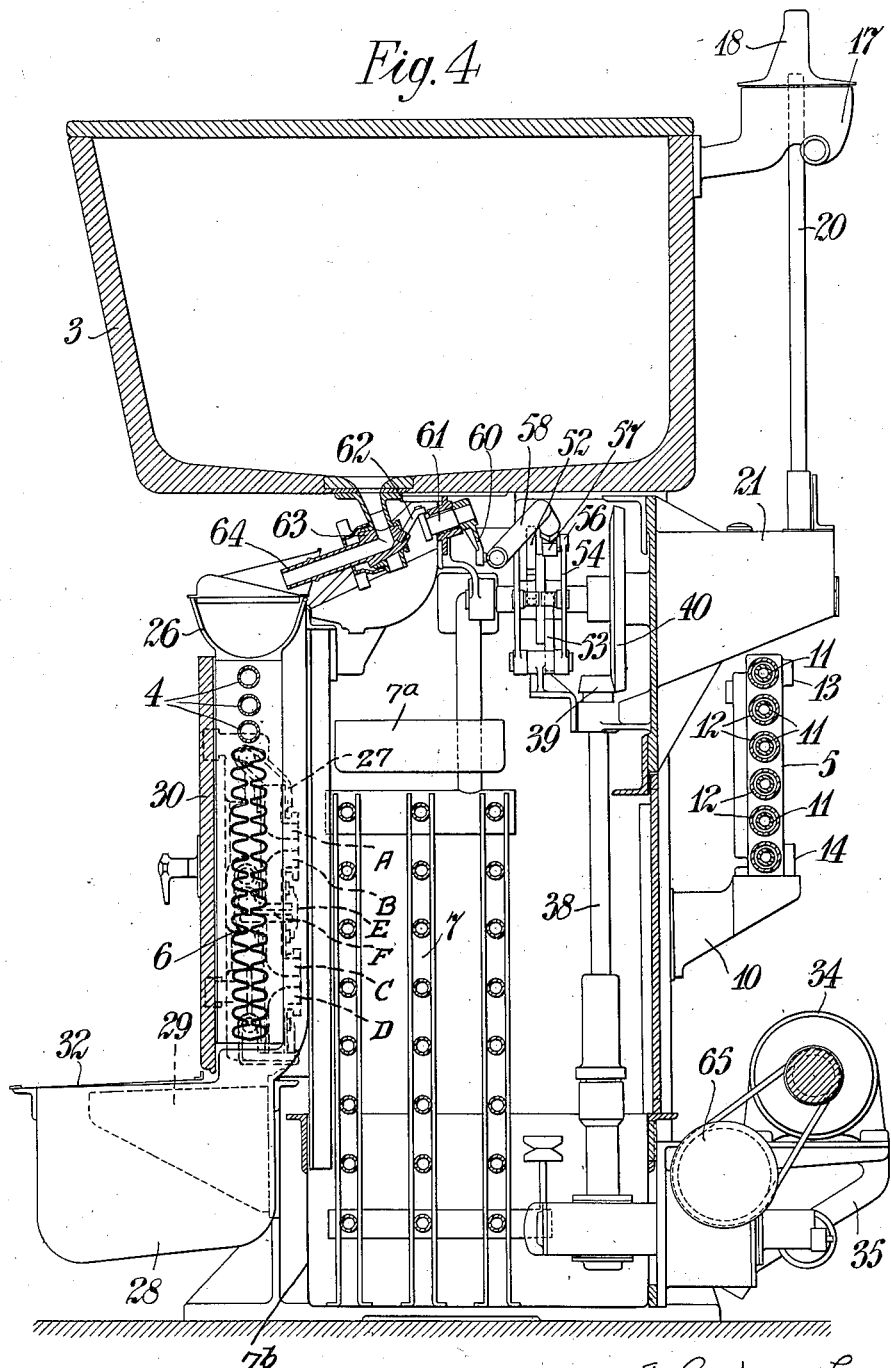
Figure 4 is a transverse section of the same apparatus or plant taken on the line A—A in Figure 1.

The refrigerating unit which supplies chilled water for the lower portion of the cooler is incorporated in the frame of the apparatus and is indicated generally at 7 in Figures 4 and 5. The refrigerator is of a known type in which liquid ammonia, for example, is expanded in a pipe coil and the cooling medium, e. g. water, is circulated by means of a pump 33 driven by a motor 34 mounted on a bracket 35 secured to the main frame of the apparatus. The water passes from the outlet C of the chilled water portion of the cooler 6 to a distributing tray 7a from which it descends over the pipe coils of the refrigerator 7 and is collected in the catch tank 7b. The pump 33 draws the chilled water from the catch tank for circulation to the cooler.

Figure 10:
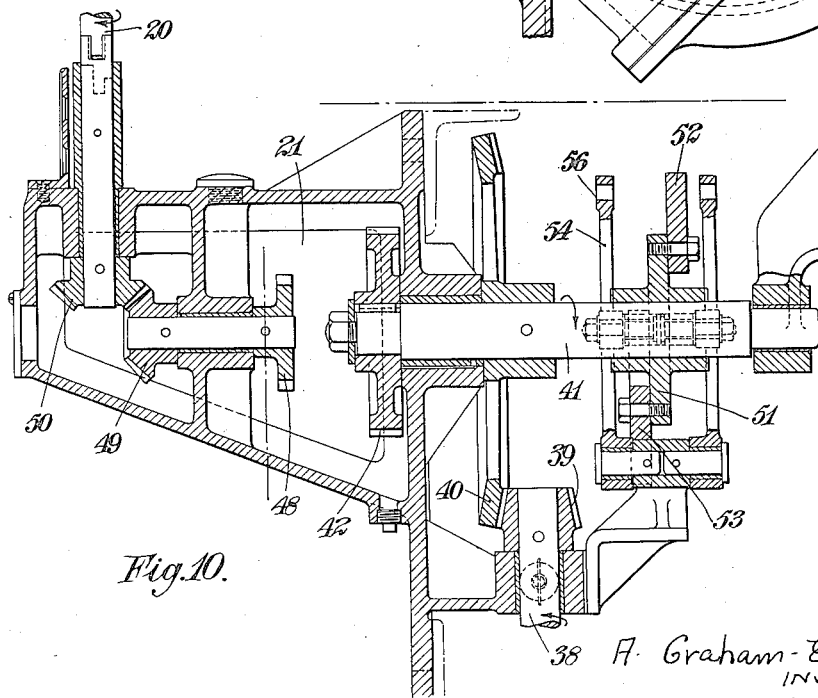
Figure 10 is a section of the timing mechanism for operating the distributor.

The tank 3, which serves to contain the milk during the holding stage of the pasteurization process, is divided in this instance into four compartments, as previously stated, and may be suitably lagged and provided with hinged insulated covers 36 and 37. The flow of milk into the various compartments of the tank is controlled by the distributing head 18 which is actuated at predetermined intervals by the timing mechanism 21, the details of which are shown in Figure 10. A vertical shaft 38 driven continuously from the motor 34 drives a horizontal shaft 41 through bevel wheels 39, 40. A gear wheel 42 mounted on shaft 41 meshes with a gear wheel 43 mounted on a shaft 43a (see Figure 11) which also carries a mutilated disc 44 and an arm 45 forming one element of a Geneva mechanism, the complementary element 46 of which carries a gear 47 meshing with the gear 48 from which the drive is transmitted through bevel gears 49, 50 to the vertical shaft 20. The shaft 41 also operates the mechanism controlling the valves for emptying the tank compartments which will now be described. Mounted on the said shaft 41 is a cam disc 51 carrying cam plates 52 and 53 which are adapted to control the motions of four (or more) pivoted bell crank levers 54 arranged to actuate their respective valves. The complete operating mechanism (see Figures 4 and 5) is shown as applied to one of the emptying valves only, but it will be understood that similar mechanism is employed to operate the other valves with suitable modification of the shape and arrangement of the levers 58. Each bell crank lever carries a roller 55 which co-operates with the cam plate 53 and a pin 56 which is received by a head 57 carried by a lever 58, the further end of which is connected to a crank 60. A spring 59 ensures that the roller 55 of the bell crank lever 54 remains always in contact with the cam. The crank 60 is mounted on a short shaft 61 to which is attached an eccentrically mounted operating pin 62 engaging the rotary member 63 of a valve controlling the outflow of one of the tank compartments. Formed integrally with the rotary member 63 is a spout 64 which is arranged to discharge into the trough 26, appropriate covers being provided to exclude dirt and other foreign matter.

Figure 8:
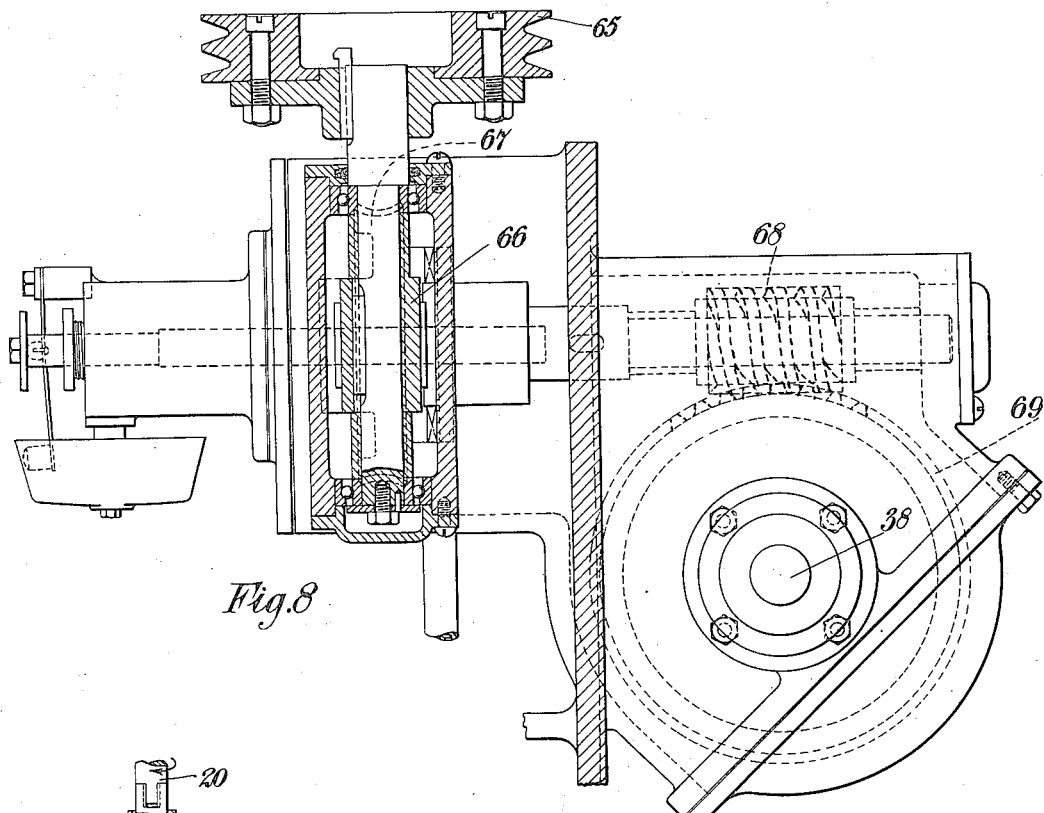
Figure 8 is a plan view partly in section of the drive for the valve actuating mechanism.
Figure 9:
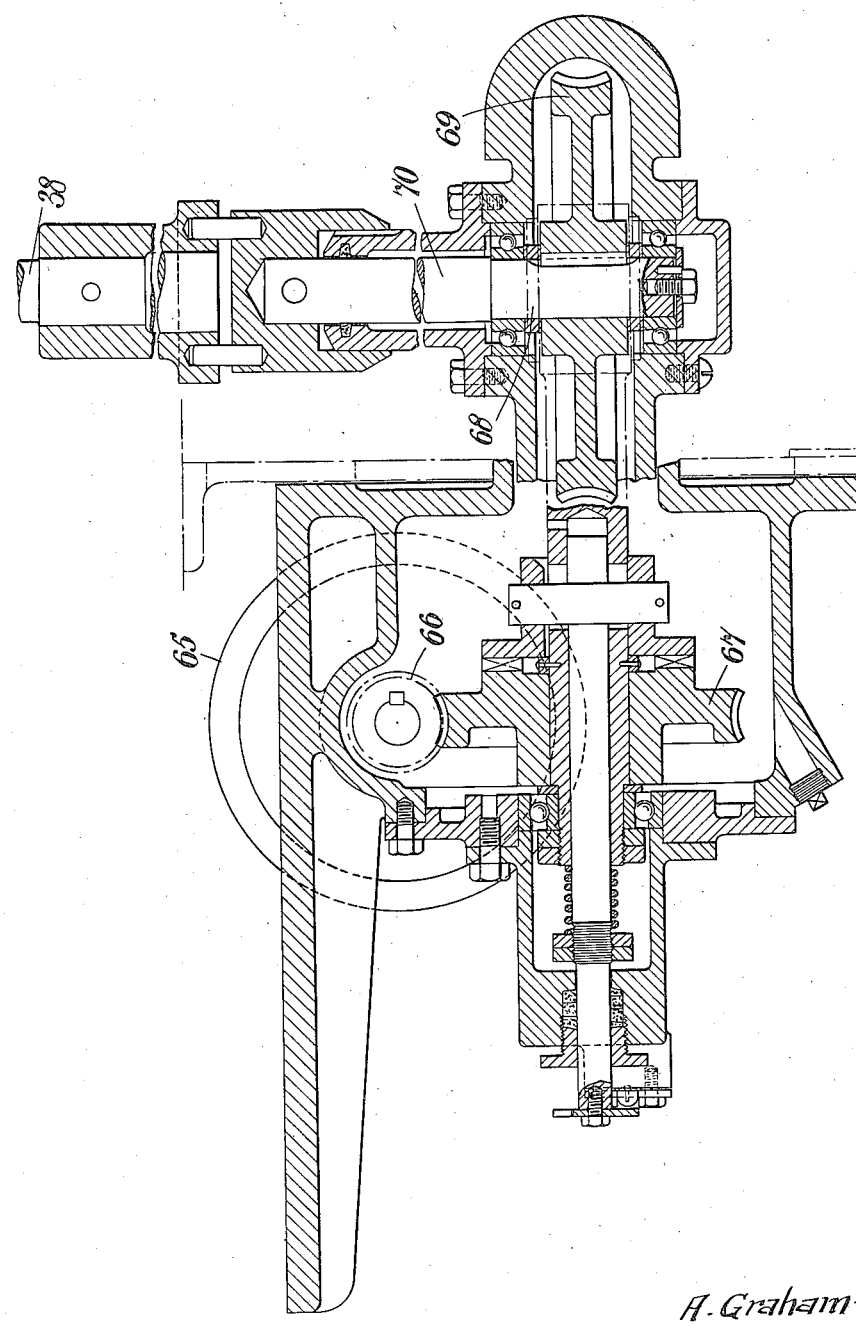
Figure 9 is a vertical section of a further portion of the drive shown in Figure 8.

The timing and valve actuating mechanism described above is driven from the motor 34 through double worm reduction gear, the details of which may be gathered from Figures 8 and 9; alternatively the drive may be taken from a belt-driven shaft. The pulley 65 is belt-driven from the motor or other shaft and is mounted on a shaft carrying a worm 66 which meshes with a worm wheel 67. Mounted on the same shaft as the worm wheel 67 is a second worm 68 which meshes with a worm wheel 69 keyed to a vertical shaft 70 which is suitably coupled to the shaft 38. It will be seen that by the mechanism described the horizontal shaft 41 carrying the valve operating cams is rotated continuously at a slow speed, and the arrangement of the cam plates 52 is such that the compartment discharge valves will be opened and closed in sequence and at regular intervals. At the same time the vertical shaft 20 is given a quarter turn (or other fractional turn) at predetermined intervals, so that the inflowing milk is directed into the different compartments in turn. The operation of the distributor and of the tank emptying valves is timed so that the compartments are filled one after another and one compartment is being filled whilst the succeeding compartment is being emptied in preparation for filling. In this way the supply of milk to the apparatus is maintained at a constant rate and at the same time the milk is retained in each compartment for approximately half an hour which represents the holding stage of the milk pasteurizing process. The cam plates 52 which control the operation of the outlet valves of the holding compartments are shaped to give a gradual opening of the valve so that the necessary relationship is maintained between the valve opening and the head of liquid in the tank to give a steady flow of milk from each compartment in turn.

Figure 3:
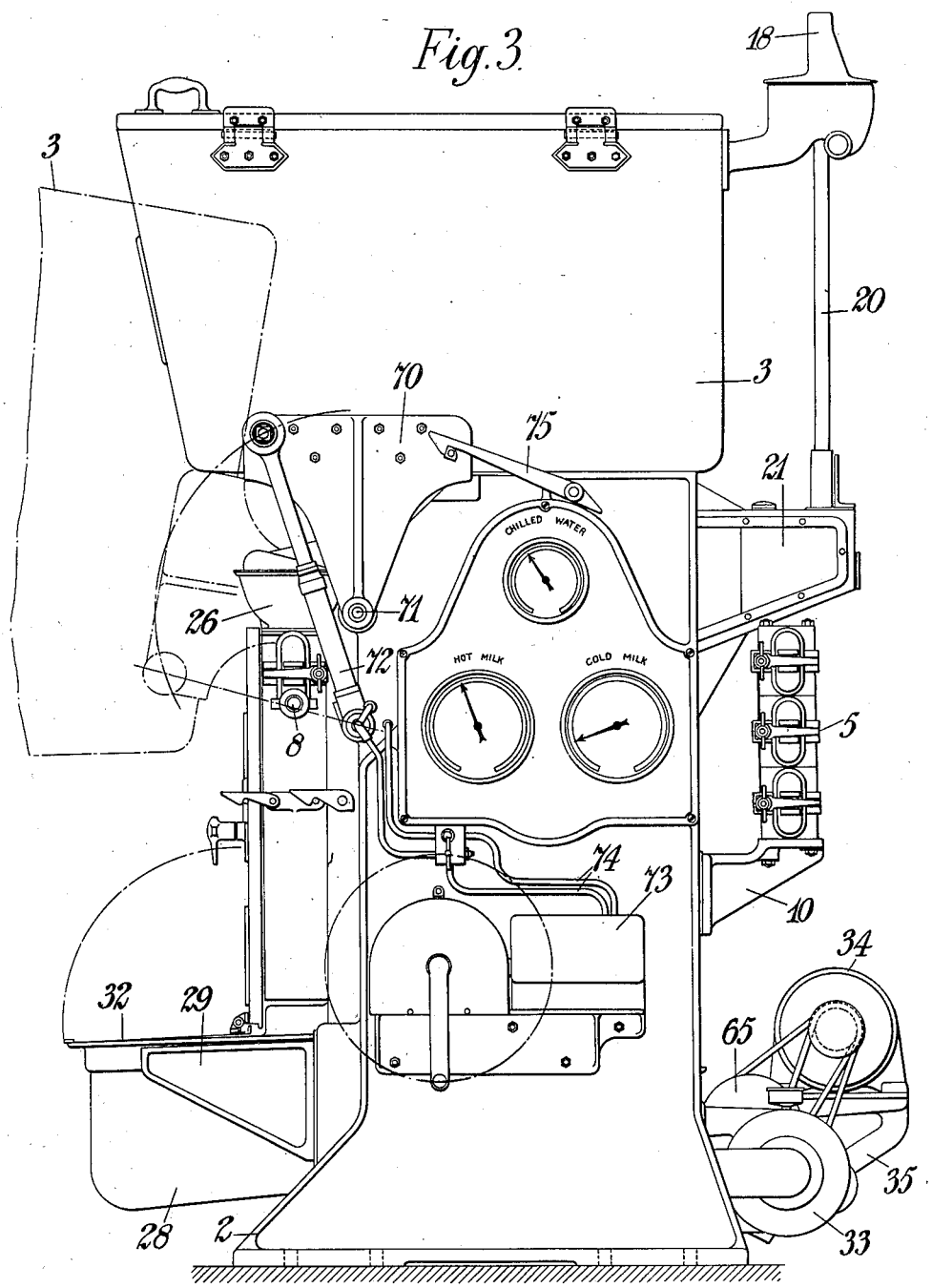
Figure 3 is a view of the right-hand of the apparatus or plant shown in Figure 1.

The tank 3 is carried on swinging supports 70 which are pivotally mounted on the frame at 71 so that the tank may be tilted downwardly into the position indicated by the dotted lines in Figure 3, thus affording easy access to the interior of the tank for inspection and cleaning purposes. The tilting of the tank is preferably effected by means of hydraulic jacks 72 arranged at either end thereof as seen in Figure 1. The cylinder of each jack is pivoted to the frame of the apparatus and the ram is pivotally connected to a suitable point on the swinging support 70. Pressure fluid for operating the jacks is supplied by a pump 73 through connections 74. A safety catch 75 may be provided for normally holding the tank in its upright position. The shaft 20 for operating the distributor includes a coupling member which is readily detachable when it is desired to tilt the tank. As an alternative to hydraulic jacks, screw jacks or lever devices may be employed.

In the operation of the plant the untreated milk first enters the preheating pipes 4 which are continuously exposed to the flow of heated milk discharged from the holding compartments of the tank 3, and the milk thus receives a preliminary heating prior to entering the heater proper. In passing through the heater 5 the temperature of the milk is raised to approximately 145° F. which is the pasteurizing temperature and the heated milk is then delivered into one of the compartments of the insulated holding tank 3 where the said temperature is maintained for a predetermined period, usually about thirty minutes, and the pasteurization is thereby completed. At the end of this period, the so-called holding period, the pasteurized milk is discharged into the distributing trough 26 from which it flows by gravity in a thin film or curtain over the preheating pipes 4 and cooler 6, the cold incoming milk passing through the preheating pipes abstracting heat from the pasteurized milk which is still further cooled by its passage in film form over the cooler 6, so that it reaches the collecting trough 28 at a temperature suitable for bottling or storage.

By the disposition of the various parts of the apparatus in the manner described, the cubic and floor space requirements are reduced to a minimum, while at the same time all parts are readily accessible. Furthermore the arrangement obviates any necessity for pumping the hot pasteurized milk, gravity being employed for effecting the necessary movement of the milk between the holding tank and the cold treated milk tank or other place of reception. This is an important advantage because it has been found that pumping or the application of pressure to the pasteurized milk has a deleterious effect on the quality of the product. The construction of the apparatus is also such as to exclude dust and foreign matter at every point in the passage of the milk through the plant while allowing for easy inspection and cleaning of all parts with which the milk comes into contact.

It will be understood that while the invention is particularly applicable to the pasteurization of milk, it is not restricted thereto, but may be equally well applied to the treatment of other liquids with suitable modification of the times and temperatures involved.

Moreover, the form of apparatus described above by way of example, may be variously modified in order to suit such particular conditions or requirements as may be met with in the practice of the invention. For example, the number of compartments into which the holding tank is divided is not limited to four but may be varied as desired, and may even be reduced to two, in which case according to a modified form of the invention two similar machines may be operated in parallel to enable continuous processing. Moreover, the particular valve devices for controlling the flow of milk to and from the various compartments are capable of modification in various ways as will be obvious to those familiar with the art.

Having now described my invention, what I claim as new and desire to secure by Letters Patent is:—

1. In an apparatus for continuous pasteurization of milk or other liquids, means for heating the liquid to the pasteurizing temperature, a plurality of holding containers for receiving the heated liquid and in which the liquid is maintained at said temperature for a predetermined period, a frame structure supporting said container, regenerative preheating elements disposed on said structure immediately beneath said containers, cooling elements also disposed on said structure immediately beneath said preheating elements and means for distributing the liquid by gravity from the containers to the preheating and cooling elements in direct succession.

2. In an apparatus for continuous pasteurization of milk or other liquids, a plurality of holding containers in which heater liquid is maintained at the pasteurizing temperature, a frame structure supporting said containers, heating elements supported on said structure below said containers, regenerative preheating elements disposed immediately beneath the containers and cooling elements disposed beneath said preheating elements and all supported by said structure, and means for distributing the liquid by gravity from the containers to the preheating and cooling elements in direct succession whereby the path of the pasteurized liquid is short and direct and such liquid is not subjected to pressure conditions.

3. In an apparatus for continuous pasteurization of milk or other liquids, a plurality of holding containers for receiving the heated liquid and in which the same is maintained at the pasteurizing temperature for a predetermined period, a unitary frame structure supporting said containers, heating elements supported on said structure and arranged to one side thereof and below the containers, regenerative preheating elements disposed immediately beneath the containers, cooling elements disposed vertically beneath and adjacent said preheating elements, both preheating and cooling elements being supported on the structure, and means for distributing the liquid by gravity from the containers to the preheating and cooling elements in direct succession.

4. In an apparatus for continuous pasteurization of milk or other liquids, means for heating the liquid to the pasteurizing temperature, a plurality of holding containers for receiving the heated liquid and in which the same is maintained at said temperature for a predetermined period, a unitary frame structure supporting said containers, regenerative preheating elements disposed on said structure immediately beneath said containers, cooling elements also disposed on said structure immediately beneath said preheating elements, refrigerating means comprising evaporative elements and means for circulating the chilled medium from said evaporator elements to said cooler elements also carried by said structure and disposed adjacent the vertically arranged preheater and cooler elements and means for distributing the liquid by gravity from the containers to the preheating and cooler elements in direct succession to cause the same to flow over said elements in a film.

5. In an apparatus, for continuous pasteurization of milk or other liquids in which the liquid is passed through a heater to one of a plurality of holding containers and after remaining therein for a predetermined period passes to a cooling device, a unitary frame structure, heating and cooling means and holding container compartments carried on said structure, and regenerative preheating means disposed on said structure between the cooling means and the superposed compartments and immediately beneath the latter, the heating and preheating means being arranged at substantially the same level, means affording communication between the preheating means and the cooling means, means affording a short and direct connection between the heating means and the holding compartments and means for distributing liquid from the holding compartments to the preheating and cooling elements in direct succession, whereby the liquid after passing through the preheating and heater is subjected to a short and direct lift to the holding containers and from thence flows continuously downward by gravity until the cooling stage is completed.

6. Apparatus for continuous pasteurization of milk or other liquids, comprising a series of holding compartments, a unitary frame structure supporting said compartments, controlled outlet means for said compartments, a vertical stack of regenerative preheating pipes disposed on said structure immediately beneath said outlets, a vertical stack of cooler elements disposed immediately beneath said preheating elements, and a vertical stack of heater elements disposed on said structure at substantially the same level as the preheating pipes, means affording a short and direct connection between the heater elements and the holding compartments and means for distributing liquid from the said controlled outlet means to the preheating pipes and cooling elements, whereby the liquid after passing through the heating elements is caused to pass by a short lift to one of the holding compartments and thence falls continuously downwards under gravity over the cooler elements.

7. Apparatus according to claim 6, comprising a refrigerating unit mounted on said structure between the cooler and heater elements, and means for circulating chilled medium from said unit to said cooler.

8. Apparatus for continuous pasteurization of milk or other liquids, comprising a tank having holding compartments in which the liquid is maintained at pasteurizing temperature for a predetermined period mounted upon a frame structure and heater and cooler elements supported upon said structure and disposed beneath said tank, and means pivotally connecting said tank to the frame structure at a point below the bottom of the tank whereby the latter may be tilted to bring the compartments to a lower position to afford access for cleaning or inspection.

9. Apparatus for continuous pasteurization of milk or other liquids, comprising a tank having holding compartments in which the liquid is maintained at pasteurizing temperature for a predetermined period mounted upon a frame structure and heater and cooler elements supported upon said structure and disposed beneath said tank, means pivotally connecting said tank to the frame structure at a point below the bottom of the tank whereby the latter is tiltable to a position in which the interior of the compartments is exposed at a lower level to afford access for inspection and cleaning and mechanical means for controlling the movement of the tank from normal to lowered position.

10. Apparatus for continuous pasteurization of milk or other liquids, comprising a tank with holding compartments in which the liquid is maintained at the pasteurizing temperature for a predetermined period, mounted upon a frame structure and heater and cooler elements for the liquid supported upon said structure and disposed beneath said tank, means pivotally connecting said tank to the frame at a point below the bottom of the tank whereby the latter is tiltable to a position in which the interior of the compartments is exposed at a lower level to afford access for inspection and cleaning and hydraulic jack means on said frame and pivotally connected to the tank for effecting the tilting of the tank in either direction.

11. Apparatus according to claim 10 comprising pump means mounted on said frame structure for operating the hydraulic jacks.

ARTHUR GRAHAM-ENOCK.